United States Patent

McKee et al.

Patent Number: 5,837,777
Date of Patent: Nov. 17, 1998

[54] PREPARATION OF RUBBER-MODIFIED MOLDING MATERIALS USING PEROXY-CONTAINING COMPOUNDS

[75] Inventors: Graham Edmund McKee, Neustadt; Rainer Moors, Germersheim; Walter Heckmann, Weinheim; Harald Larbig, Ludwigshafen; Bernhard Rosenau, Neustadt, all of Germany

[73] Assignee: BASF Aktiengesellschaft, Ludwigshafen, Germany

[21] Appl. No.: 836,312

[22] PCT Filed: Nov. 14, 1995

[86] PCT No.: PCT/EP95/04476

§ 371 Date: May 12, 1997

§ 102(e) Date: May 12, 1997

[87] PCT Pub. No.: WO96/15164

PCT Pub. Date: May 23, 1996

[30] Foreign Application Priority Data

Nov. 14, 1994 [DE] Germany .................. 44 40 674.6

[51] Int. Cl.⁶ .......................................................... C08F 8/00
[52] U.S. Cl. .................. 525/263; 515/308; 515/330.3; 515/387
[58] Field of Search .................... 525/308, 263, 525/387

[56] References Cited

U.S. PATENT DOCUMENTS

| | | | |
|---|---|---|---|
| 4,342,676 | 8/1982 | Ivanchev et al. | 524/458 |
| 4,397,992 | 8/1983 | Johansson et al. | 525/305 |
| 5,367,029 | 11/1994 | Fischer et al. | 525/301 |

FOREIGN PATENT DOCUMENTS

| | | |
|---|---|---|
| 95 919 | 12/1983 | European Pat. Off. . |
| 594 056 | 4/1994 | European Pat. Off. . |
| 143 991 | 6/1995 | European Pat. Off. . |
| 2328004 | 5/1977 | France . |
| 1182811 | 2/1962 | Germany . |
| 7103182 | 5/1965 | Japan . |
| 60-210666 | 4/1984 | Japan . |
| 90/03998 | 4/1990 | WIPO . |

OTHER PUBLICATIONS

Vollmert et al., *App. Macrom. Chem.*, No. 3, 1968, pp. 1–27.

*Primary Examiner*—Bernard Lipman
*Attorney, Agent, or Firm*—Keil & Weinkauf

[57] ABSTRACT

In the preparation of a rubber-modified molding material, in a first stage, a first mixture (A) contains at least one alkyl acrylate or methacrylate (a) of the formula (I)

$$CH_2=CH-COOR^2 \quad\quad (I) \atop {\overset{R^1}{|}}$$

where $R^1$ is hydrogen or methyl and $R^2$ is alkyl of 1 to 32 carbon atoms, if required a first monomer (b) having two or more double bonds and, if required, also a second monomer (c) or a plurality thereof is polymerized, preferably with free radicals, to give a rubber (B), in a second stage, a third monomer (d) or a plurality thereof is added to the resulting rubber (B) to form a second mixture (C), whereby the rubber (B) is dissolved or swollen in the third monomer (d), with or with the addition of a solvent, and in a third stage, the second mixture (C) formed is polymerized with free radicals to give the rubber-modified molding material (D), and the mixture is reacted at >120° C., during or after this polymerization, with a compound (e) which contains at least two peroxy groups.

15 Claims, No Drawings

PREPARATION OF RUBBER-MODIFIED MOLDING MATERIALS USING PEROXY-CONTAINING COMPOUNDS

The present invention relates to a process for the preparation of rubber-modified molding materials, in particular acrylonitrile/styrene/acrylate molding materials, in which a compound which contains peroxy groups is used, and to rubber-modified molding materials prepared by the process.

Rubber-modified molding materials are materials in which domains of elastomers, for example rubbers, are embedded in a matrix comprising a thermoplastic. There is considerable demand for rubber-modified molding materials which have surface gloss, impact strength and tensile strength. The characteristic domain structure is responsible for the desired mechanical properties.

The multiphase character and hence also the domain structure of rubber-modified molding materials is based on the fact that they are composed of different polymer components which are immiscible or only partly miscible with one another. The impact strength thereof results from increased energy absorption during deformation up to fracture. The energy is consumed for the formation of microcavities or for initiating sliding processes of the matrix polymer chains. The multiphase character is therefore essential for achieving high impact strengths.

The following are applicable below:
1. The two chemically different polymer components form a stable dispersion of defined particle size, which neither exhibits phase separation in the thermoplastic melt (processing) nor tends to homogenization with formation of a macromolecular solution at high temperatures.
2. Coupling must occur between the elastomer particles and the matrix i.e. it must be possible to transmit forces at the phase boundaries.

The most effective phase coupling at the boundaries of the elastomer particles is achieved by graft copolymerization. For example, in the preparation of acrylonitrile/styrol/acrylate (ASA) molding materials, the procedure generally adopted is one in which an acrylate rubber is initially taken and, by polymerization with a monomer mixture comprising styrol and acrylonitrile, copolymers based on the latter two monomers are then grafted on.

EP 0 095 919, DE 1 182 811, JA 7103 182, JA 60 21 0666, EP 0 143 991, EP 0 438 418 and B. Vollmert, Angewandte Makromolekulare Chemie, 3 (1968), 1–27, described the preparation of thermoplastics modified with acrylate rubber.

Starting from this, it is an object of the present invention to provide a process for the preparation of rubber-modified molding materials having improved mechanical properties, in particular higher impact strength and notched impact strength.

We have found that this object is achieved by the novel process, in which, in a first stage, a first mixture (A) which contains at least one alkyl acrylate or methacrylate (a) of the general formula (I)

(I)

where $R^1$ is hydrogen or methyl and $R^2$ is alkyl of 1 to 32 carbon atoms, if required a first monomer (b) having two or more double bonds and, if required, a second monomer (c) or a plurality thereof is polymerized, preferably in solution, preferably with free radicals, to give a rubber (B), in a second stage, a third monomer (d) or a plurality thereof is added to the resulting rubber (B) to form a second mixture (C), and in a third stage, the second mixture (C) formed after dissolution or swelling is polymerized with free radicals to give the rubber-modified molding material (D).

In the second stage, the rubber (B), with or without the addition of a solvent, is preferably dissolved or swollen in the third monomer (c).

A graft copolymerization takes place in the third stage, the backbone of the resulting graft copolymer being formed by the rubber (B), and the grafts being composed of the third monomer (d). Because 100% grafting does not occur, some of the rubber remains ungrafted and at the same time a chain polymer is formed from the third monomer (d), so that three types of molecules are present in the molding material, ie. molecules of the rubber (B), of the polymer of (d) and of the rubber (B) grafted with (d).

During or after the polymerization of the third stage, the batch is treated at >120° C. with a compound (e) which contains at least two peroxy groups. The compound (e) may be added at any time during the preparation of the molding materials. However, if it is added to stage 1, the reactivities of the peroxy groups should be chosen so that they do not decompose or are not activated until during or after the polymerization of stage 3.

The improved mechanical properties of the molding materials prepared are due in particular to the use of the compound (e). The compound (e) results in a higher grafting yield and hence better coupling of the rubber to the matrix and a higher degree of crosslinking of the rubber phase (see above). The compound (e) chosen is one which, at the treatment temperatures, has a decomposition rate which ensures that a sufficient number of free radicals form. In the case of particularly suitable compounds (e), the temperature at which they have a half-life of one hour is from 120° to 170° C. Examples of compounds (e) are tert-butyl diperoxycarbonate, 2,5-dimethyl-2,5-bis(benzoylperoxy) hexane, dicyclohexylidene diperoxide, tricyclohexylidene triperoxide, dicyclopentylidene diperoxide, diisopropylidene diperoxide, 2,2-bis(tert-butylperoxy)propane, 2,2-bis(tert-butylperoxy)butane, 1,1-bis(tert-butylperoxy)cyclohexane and 2,5-bis(tert-butylperoxy)-2,5-dimethylhexane, the last-mentioned compound being preferred.

Examples of alkyl groups $R^2$ of 1 to 32 carbon atoms are methyl, ethyl, n-propyl, isopropyl, n-butyl, isobutyl, tert-butyl, n-pentyl, isopentyl, n-hexyl, n-heptyl, n-octyl, ethylhexyl, n-nonyl, n-decyl, n-dodecyl, n-tetradecyl, n-hexadecyl, n-octadecyl, n-eicosyl, n-docosyl, n-tetracosyl, n-hexacosyl, n-octacosyl, n-triacontyl, n-hentriacontyl and dotriacontyl.

In a preferred embodiment of the invention, $R^2$ is alkyl of 1 to 18 carbon atoms.

In a further preferred embodiment of the invention, the mixture (A) has the following composition:
- from 30 to 100% by weight of the alkyl acrylate or methacrylate (a),
- from 0 to 10% by weight of the first monomer (b) and
- from 0 to 60% by weight of the second monomer (c);

preferred ranges are:
- from 36 to 99.9% by weight of (a),
- from 0.1 to 4% by weight of (b) and
- from 0 to 60% by weight of (c), the stated percentages by weight being based on the totality of (a), (b) and (C).

The rubber (B) preferably has a glass transition temperature of less than 0° C., preferably less than −10° C., the glass transition temperature being determined by means of DSC according to ASTM 3418. The rubber thus has the required softness. The glass transition temperature can be established either by using an acrylate or methacrylate whose polymer has the desired glass transition temperature or by using a mixture of acrylates or methacrylates which have different lengths of the side chains ($R^2$ in the formula I). This adjustment of the glass transition temperature is based on the fact that the glass transition temperature of acrylate and methacrylate polymers initially decreases with increasing length of the side chain, then passes through a minimum and finally increases again. The minimum occurs at a side chain of about 7 carbon atoms for polyacrylates and at a side chain of 10 carbon atoms for polymethacrylates. This general range for the length of the side chains $R^2$ is therefore preferred.

The rubber-modified molding material (D) prepared contains from 1 to 60, preferably from 5 to 40%, by weight of the rubber (B). The upper limit is determined by the fact that the molding material must have sufficient strength in spite of the embedded domains of the rubber. The lower limit is essentially determined by the fact that sufficient energy must be absorbed during deformation.

In a further preferred embodiment of the invention, the alkyl acrylate or methacrylate (a) used is n-butyl acrylate or ethylhexyl acrylate.

The examples of first monomers (b) are allyl methacrylate, butanediol diacrylate, divinylbenzene, triallyl cyanurate and dihydrodicyclopentadienyl acrylate, allyl methacrylate being preferred.

Examples of second monomers (c) are substituted and unsubstituted styrene, acrylonitrile, acrylic acid, methacrylic acid, derivatives of the two last-mentioned ones, such as acrylamide, methacrylamide, glycidyl acrylate and glycidyl methacrylate, maleic anhydride, maleimide and ethylene. Further examples are monomers which contain groups which form free radicals on thermal decomposition, such as peroxy groups, diazo groups and labile C—C bonds, eg. tert-butyl 3-isopropenylcumyl peroxide or tert-butyl peroxycrotonate, and acrylamide derivatives, such as methylolacrylamide methyl ether, N-methylolacrylamide, methylolmethacrylamide methyl ether, N-methylolmethacrylamide, N-methylolmethacrylamide butyl ether and N-methylolmethacrylamide acetate, N-methylolmethacrylamide being preferred. The mixture (A) contains up to 60, preferably up to 40%, by weight of these monomers.

Particularly preferred second monomers (c) are styrenes of the formula

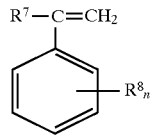

where $R^7$ and $R^8$, which may be identical or different, are each hydrogen or alkyl of 1 to 8 carbon atoms and n is from 0 to 4, and acrylonitrile. Accordingly, in particular ASA molding materials are prepared by the novel process.

In the third stage of the novel process, polymerization either can be carried out continuously as a solution or mass polymerization or can be continued as a suspension polymerization after a conversion of at least 15%.

The content of acrylate monomer units in the rubber is at least 30, preferably at least 60, particularly preferably at least 90%, by weight.

The polymerization is carried out at from 0° to 200° C., preferably from 50° to 160° C. All conventional polymerization processes may be used, but free radical polymerization is preferred.

The mixtures may contain additives, such as lubricants, antioxidants, colorants, glass fibers and/or fillers.

In the molding material, the rubbers in grafted form are present as particles having a diameter of from 0.1 to 20 μm, preferably from 0.1 to 10 μm, in the polymer matrix. Bimodal or trimodal distributions are preferred. The rubber particles are in the form of capsules, rods, drops, labyrinths, cells, coils, shells, rod clusters or drop clusters. However, particles which consist of a plurality of spherical particles are also preferred. Cells and the last-mentioned type are preferred. The stated particle forms are described in A. Echte, Advances in Chemical Serials, 222 (1989), 29.

The invention is described in detail below with reference to particularly preferred embodiments.

EXAMPLES

The following compounds are used in the Examples: to cyclohexane, n-butyl acrylate, allyl acrylate, acrylonitrile and styrene are products from BASF and are used without further purification.

Luviskol K 90 is also a product from BASF and is a polyvinyl-pyrrolidone having a K value of 90, measured in 1% strength solution in water at 25° C. The measurement of the K value is described in Cellulose Chemie 13 (1932), 358–364.

Tetrasodium diphosphate was obtained from Merck, and azobisisobutyronitrile from Akzo Chemicals.

The stabilizer used was octadecyl 3-(3,5-di-tert-butyl-4-hydroxyphenyl)propionate, a phenolic antioxidant which is sold under the name Irganox 1076 by Ciba Geigy.

Ertivinol is a polyvinyl alcohol from Ercros.

The following peroxides were used:

|  | Temperature in °C. for $t_{1/2}$ of | | |
|---|---|---|---|
|  | 0.1 | 1 | 10 h |
| tert-Butyl peroxy-crotonate (i) | 136 | 110 | 106 |
| 2,5-Bis(tert-butyl-peroxy)-2,5-di-methylhexane (ii) | 156 | 134 | 115 |
| 1,1-Bis(tert-butyl-peroxy)cyclohexane (iii) | 134 | 113 | 94 |
| Dicumyl peroxide (iv) | 153 | 132 | 112 |
| Dibenzoyl peroxide (v) | 111 | 91 | 73 |

Experiment 1 (comparison)
a) Rubber preparation 1856 g of cyclohexane were introduced into a flask and heated to 75° C. under nitrogen and with stirring, and 36 ml of feed 1 and 4 ml of feed 2 were then introduced. After 15 minutes, the remainder of the two feeds was added in the course of about 4 hours.

Feed 1
   641 g of n-butyl acrylate
   6.09 g of allyl methacrylate
   6.4 g of N-methylolmethacrylamide Feed 2
   42 ml of acetone
   42 ml of toluene
   699 mg of 2,2'-azobisisobutyronitrile b) Preparation of the end product The cyclohexane was removed in a rotary evaporator under reduced pressure and was replaced with styrene, after which acrylonitrile was added to give a mixture of 69.2% by weight of styrene, 23% by weight of acrylonitrile and 7.8% by weight of rubber. 1923 g of this solution, together with 2.31 g of Irganox 1076, 1.92 g of dibenzoyl peroxide and 1.35 g of tert-dodecyl mercaptan, were introduced into a 5 l steel kettle and heated to 86° C. in a nitrogen atmosphere with stirring. At a conversion of 35% by weight, 1.7 g of dicumyl peroxide, 1900 g of water, 20 g of Luviskol K 90, 2.0 g of tetrasodium diphosphate and 59.8 g of a 10% strength solution of Ertivinol in water were added. Polymerization of the batch was completed as follows:

at 110° C. for 3 hours
at 130° C. for 3 hours
at 140° C. for 6 hours.

The mixture was then cooled and the polymer was filtered off and dried.

Experiment 2 (Comparison)

Experiment 1 was repeated, but with 5.77 g of 1,1-bis (tert-butylperoxy)cyclohexane in the initially taken mixture in the styrene/acrylonitrile polymerization.

Experiment 3 (according to the invention)

Experiment 2 was repeated, but with 2,5-bis(tert-butylperoxy)-2,5-dimethylhexane instead of 1,1-bis(tert-butylperoxy)cyclohexane.

Experiment 4 (comparison)

a) Rubber preparation 1100 g of cyclohexane were introduced into a flask and heated to 75° C. under nitrogen and with stirring, and 30 ml of feed 1 and 4 ml of feed 2 were then introduced. After 15 minutes, the remainder of the two feeds was added in the course of about 4 hours.

Feed 1

500 g of n-butyl acrylate
4.75 ml of toluene
545 mg of 2,2'-azobisisobutyronitrile b) Preparation of the end product The cyclohexane was removed in a rotary evaporator under reduced pressure and was replaced with styrene, after which acrylonitrile was added to give a mixture of 69.2% by weight of styrene, 23% by weight of acrylonitrile and 7.8% by weight of rubber. 1923 g of this solution, together with 2.31 g of Irganox 1076 were introduced into a 5 l steel kettle and heated to 95° C. under nitrogen with stirring. At a conversion of about 35% by weight, 1.7 g of dicumyl peroxide, 1900 g of water, 20 g of Luviskol K 90, 2.0 g of tetrasodium diphosphate and 59.8 g of a 10% strength solution of Ertivinol in water were added. Polymerization of the batch was completed as follows:

at 110° C. for 3 hours
at 130° C. for 3 hours
at 140° C. for 6 hours.

The mixture was then cooled and the polymer was filtered off and dried.

Experiment 5 (according to the invention)

Experiment 4 was repeated, but 5.77 g of 2,5-bis(tert-butylperoxy)-2,5-dimethylhexane were additionally introduced into the initially taken mixture.

Testing of the products

The products were injection molded at a melt temperature of 240° C. and a mold temperature of 60° C. to give standard small bars.

The hole impact strength according to DIN 53753-L-3-0, 4/81 edition, and the impact strength according to DIN 53453-n, 5/75 edition, were measured for these moldings.

Results

| Experiment | Peroxides | AN[1] kJ/m$^2$ 23° C. | AKL[2] kJ/m$^2$ 23° C. |
|---|---|---|---|
| 1 | (iv), (v) | 13 | 4.9 |
| 2 | (iii), (iv), (v) | 10 | 5.5 |
| 3 | (ii), (iv), (v) | 32 | 8.3 |
| 4 | (i), (iv) | 23 | 4.8 |
| 5 | (i), (ii), (iv) | 32 | 8.3 |

[1]Impact strength
[2]Hole impact strength

As can be seen, particularly the addition of 2,5-di-tert-butylperoxy-2,5-dimethylhexane leads to a substantial improvement in the mechanical properties of the molding materials.

We claim:

1. A process for the preparation of a rubber-modified molding material, wherein in a first stage, a first mixture (A) which contains
i) at least one alkyl acrylate or methacrylate (a) of the formula (I)

where $R^1$ is hydrogen or methyl and $R^2$ is alkyl of 1 to 32 carbon atoms,
ii) optionally a first monomer (b) having two or more double bonds, and
iii) optionally a second monomer (c) or a plurality thereof is polymerized to give a rubber (B), in a second stage, the rubber (B) is dissolved or swollen in a third monomer (d) or a plurality thereof with or without the addition of a solvent to form a second mixture (C), and in a third stage, the second mixture (C) is polymerized with free radicals to give the rubber-modified molding material (D), and the mixture is reacted at >120° C., during or after this polymerization, with a compound (e) which contains at least two peroxy groups.

2. The process defined in claim 1, wherein $R^2$ is alkyl of 1 to 18 carbon atoms.

3. The process defined in claim 1, wherein the mixture (A) has the following composition:
i) from 30 to 99.9% by weight of the alkyl acrylate or methacrylate (a),
ii) from 0 to 10% by weight of the first monomer (b), and
iii) from 0 to 60% by weight of the second monomer (c), all data in % by weight being based on the total amount of the mixture (A).

4. The process defined in claim 1, wherein the first monomer (b) is allyl methacrylate.

5. The process defined in claim 1, wherein the second monomer (c) is tert.-butyl peroxycrotonate or tert.-butyl 3-isopropenylcumyl peroxide.

6. The process defined in claim 5, wherein the additional second monomer (c) is N-methylolmethacrylamide.

7. The process defined in claim 1, wherein the alkyl acrylate or methacrylate (a) is n-butyl acrylate or ethylhexyl acrylate.

8. The process defined in claim 1, wherein the third monomer (d) is styrene and acrylonitrile.

9. The process defined in claim 1, wherein the compound (e) has a half-life of one hour at a temperature from 120° to 170° C.

10. The process defined in claim 1, wherein the compound (e) is 2,5-bis(tert.-butylperoxy)-2,5-dimethylhexane.

11. The process defined in claim 1, wherein the polymerization of the mixture (C) is continued as a suspension polymerization after conversion of at least 15%.

12. A rubber-modified material, which is prepared according to the process of claim 1 and which contains domain-forming particles of the rubber (B) which are embedded in a matrix.

13. The rubber-modified molding material defined in claim 12, wherein the rubber particles are in the form of capsules, rods, drops, labyrinths, cells, coils, shells, rod clusters or drop clusters.

14. The rubber-modified molding material defined in claim 12, wherein the rubber particles have a diameter of from 0.1 to 20 $\mu$m.

15. The process defined in claim 1, wherein the first mixture (A) is polymerized with free radicals.

* * * * *